(12) United States Patent
George et al.

(10) Patent No.: US 9,746,023 B2
(45) Date of Patent: Aug. 29, 2017

(54) THRUST WASHER

(71) Applicants: Mahle International GmbH, Stuttgart (DE); Mahle Engine Systems UK Limited, Rugby (GB)

(72) Inventors: James George, Rugby (GB); Mike Kirk, Rugby (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 0 days.

(21) Appl. No.: 14/652,104

(22) PCT Filed: Dec. 5, 2013

(86) PCT No.: PCT/GB2013/053213
§ 371 (c)(1),
(2) Date: Jun. 12, 2015

(87) PCT Pub. No.: WO2014/091207
PCT Pub. Date: Jun. 19, 2014

(65) Prior Publication Data
US 2015/0323006 A1 Nov. 12, 2015

(30) Foreign Application Priority Data
Dec. 14, 2012 (GB) .................................. 1222653.6

(51) Int. Cl.
*F16C 9/02* (2006.01)
*F16C 33/20* (2006.01)
(Continued)

(52) U.S. Cl.
CPC .............. *F16C 9/02* (2013.01); *F16C 17/045* (2013.01); *F16C 33/107* (2013.01);
(Continued)

(58) Field of Classification Search
CPC .. F16C 9/02; F16C 9/04; F16C 17/045; F16C 17/047; F16C 33/107; F16C 33/205;
(Continued)

(56) References Cited

U.S. PATENT DOCUMENTS 2,362,667 A * 11/1944 Schmidt .................. F04D 5/001
384/305
3,597,027 A * 8/1971 Herndon ................. F16C 17/04
384/305
(Continued)

FOREIGN PATENT DOCUMENTS

CN 1054656 A 9/1991
CN 1054656 A 9/1991
(Continued)

OTHER PUBLICATIONS

English abstract for EP-2574481.
(Continued)

*Primary Examiner* — Marcus Charles
(74) *Attorney, Agent, or Firm* — Fishman Stewart PLLC

(57) ABSTRACT

A thrust washer may include a metallic substrate layer having an axial substrate face. The thrust washer may also include a polymer layer on the axial substrate face. The polymer layer may have an axial polymer face opposed to the axial substrate face. The axial polymer face may be profiled and may have at least one oil distribution groove. At least one of the substrate layer and the polymer layer may be a machined layer having a thickness that may vary in correspondence with the at least one distribution groove.

20 Claims, 4 Drawing Sheets

(51) Int. Cl.
*F16C 17/04* (2006.01)
*F16C 33/10* (2006.01)
*F16C 9/04* (2006.01)

(52) U.S. Cl.
CPC .......... *F16C 33/205* (2013.01); *F16C 33/208* (2013.01); *F16C 9/04* (2013.01); *F16C 2223/42* (2013.01); *F16C 2240/42* (2013.01); *Y10T 29/49645* (2015.01)

(58) Field of Classification Search
CPC  F16C 33/208; F16C 33/1075; F16C 2240/42; F16C 2223/42; F16C 29/49696; Y10T 29/49645; Y10T 29/49696
USPC ....... 384/121, 123, 125, 276, 282, 284, 289, 384/291, 297, 368, 440; 427/271–272, 427/446
See application file for complete search history.

(56) References Cited

U.S. PATENT DOCUMENTS

| | | | |
|---|---|---|---|
| 4,348,065 A * | 9/1982 | Yoshioka | F16C 33/1075 384/121 |
| 4,522,513 A * | 6/1985 | Nozue | F16C 17/18 384/368 |
| 4,770,547 A * | 9/1988 | New | F16C 9/02 384/420 |
| 4,795,220 A * | 1/1989 | Mori | F16C 17/04 384/368 |
| 5,192,136 A * | 3/1993 | Thompson | F16C 9/02 384/123 |
| 5,230,569 A | 7/1993 | Sheedy | |
| 6,132,094 A * | 10/2000 | Cornelison | F16C 17/04 384/121 |
| 6,481,895 B2 * | 11/2002 | Yang | F16C 9/02 384/123 |
| 6,827,494 B2 * | 12/2004 | Aguilar | F16C 33/106 384/121 |
| 6,921,210 B2 * | 7/2005 | Welch | F16C 9/02 384/123 |
| 6,976,788 B2 * | 12/2005 | Honda | F16C 17/047 384/123 |
| 7,134,793 B2 * | 11/2006 | Thompson | F16C 9/02 384/123 |
| 7,354,199 B2 * | 4/2008 | Welch | F16C 9/00 384/275 |
| 7,785,013 B2 | 8/2010 | Egami et al. | |
| 2002/0094143 A1 | 7/2002 | Yang et al. | |
| 2003/0128902 A1 * | 7/2003 | Kennedy | F16C 9/02 384/275 |
| 2004/0076350 A1 * | 4/2004 | Gomyo | F16C 17/04 384/100 |
| 2006/0083451 A1 | 4/2006 | Kawagoe et al. | |
| 2006/0288579 A1 | 12/2006 | Luo et al. | |
| 2007/0259474 A1 * | 11/2007 | Shin | H01L 51/0022 438/99 |
| 2010/0215300 A1 * | 8/2010 | Schlabs | F16C 9/00 384/420 |
| 2013/0195388 A1 | 8/2013 | Ishii et al. | |

FOREIGN PATENT DOCUMENTS

| | | |
|---|---|---|
| CN | 1735755 | 2/2006 |
| CN | 1735755 A | 2/2006 |
| CN | 101035992 A | 9/2007 |
| CN | 100439070 C | 12/2008 |
| CN | 101583442 | 1/2009 |
| EP | 1752670 A1 | 2/2007 |
| EP | 2574481 A2 | 4/2013 |
| WO | WO-2009/140745 A1 | 11/2009 |
| WO | WO-2012/043332 A1 | 4/2012 |
| WO | WO-2013/094351 A1 | 6/2013 |

OTHER PUBLICATIONS

First Chinese Office Action, Chinese Application No. 201380063874.5, Dated Sep. 23, 2016.
English Abstract of CN 1735755.
English Abstract of CN 101583442.
Chinese Office Action for CN-2013800638745, dated Apr. 13, 2017.

* cited by examiner

THRUST WASHER

CROSS-REFERENCE TO RELATED APPLICATIONS

This application claims priority to British Patent Application No. 1222653.6, filed Dec. 14, 2012, and International Patent Application No. PCT/GB2013/053213, filed Dec. 5, 2013, both of which are hereby incorporated by reference in their entirety.

TECHNICAL FIELD

The present invention relates to thrust washers having an axial face provided with oil distribution grooves, in particular thrust washers for use in automotive engines, transmission, pump and compressor systems.

BACKGROUND

In internal combustion engines, the bearing assemblies typically each comprise a pair of half-bearings retaining a crankshaft that is rotatable about an axis. At least one half-bearing is a flange half-bearing that comprises a hollow generally semi-cylindrical bearing shell provided with a generally semi-annular thrust washer extending outwardly (radially) at each axial end. In some flange half-bearings, a single-piece construction of the bearing shell and thrust washers is used, whilst in other half-bearings, the bearing shell and the thrust washer are loosely mechanically engaged with clip-like features, and in a further type of half-bearing the thrust washers are permanently assembled onto the bearing shell by deformation of engagement features. In other bearing assemblies it is also known to use annular or circular thrust washer.

Once the engine has started, lubricating oil is provided between the axial journal parts of the crankshaft and the bearing shells, and between the thrust washers and the counterfaces of associated webs of the crankshaft that extend perpendicular to the rotational axis of the crankshaft. However, when the engine starts, the oil pressure is low and may provide inadequate lubrication if the shaft contacts the bearing shell or a thrust washer. Further, even when the oil is supplied at normal operating pressures, axial forces on the shaft (e.g. when a gear change is performed, or due to the design of some automatic gearboxes) may cause the shaft to contact the thrust washer. Accordingly, the thrust washer and bearing shell are provided with running surfaces that can withstand such occasional contacts. Known bi-metal thrust washers comprise a steel backing (substrate) provided with an aluminium-tin (or copper-based alloy) running layer on an axial face of the substrate, with oil distribution grooves being provided either by machining a profile into the running layer, or by an embossing operation that provides a profile by causing deformation of the aluminium-tin running layer.

Fuel-saving operating schemes have become popular for automotive engines, which increase the frequency with which the engine is started. Under a "stop-start" operating scheme, stopping and restarting vehicle movement also leads to the engine being stopping and being restarted. Under a "hybrid" operating scheme, the engine is turned off when the vehicle can be powered by an alternative power source, commonly being electrically powered. The greater frequency with which the engine is started under such operating schemes places an increased demand upon the performance of the thrust washers and bearing shells by increasing the frequency with which the counterfaces of the associated web and journals of the crankshaft respectively contact the thrust washers and bearing shells, and cause correspondingly increased wear of the running surfaces.

Oil distribution grooves extend outwardly across the axial running face, e.g. radially from the inner edge to the outer edge. The grooves may comprise a deep channel with a gently sloping ramp on each side, between the channel and pad regions. The ramp region provides a tapered clearance between the thrust washer and the counterface of the crankshaft web, in use, assisting to draw lubricating oil out of the grooves across the axial face of the thrust washer, and providing a hydrodynamic wedge of lubrication oil to assist in maintaining separation of the thrust washer and the counterface of the web. Known oil distribution grooves are machined (e.g. milled) into the running layer, or formed by an embossing process.

Known bi-metal washers are manufactured by stamping blanks from a bi-metal sheet, such that the manufacturing process produces bi-metal waste. Similarly, such washers produce further bi-metal waste at the end-of-life. However, such bi-metal waste, is difficult to recycle, due to the difficulty in separating the metals (i.e. separating the steel backing from the running layer).

SUMMARY

A first aspect of the invention provides a thrust washer comprising
 a metallic substrate layer having an axial substrate face,
 a polymer layer on the axial substrate face and having an axial polymer face opposed to the axial substrate face,
wherein the axial polymer face is profiled and has at least one oil distribution groove, and one of the substrate layer and the polymer layer is a machined layer having a thickness that varies in correspondence with the at least one oil distribution groove.

A second aspect of the invention provides a flange bearing comprising a bearing shell and a thrust washer according to the first aspect. The flange bearing (i.e. one or two thrust washers and a bearing shell) may be: detachably, loosely clipped together; assembled to be inseparably physically engaged; or, comprise a single-part construction.

A third aspect of the invention provides a method of forming a thrust washer comprising
 a metallic substrate layer having an axial substrate face,
 a polymer layer on the axial substrate face and having an axial polymer face opposed to the axial substrate face,
wherein the axial polymer face is profiled and has at least one oil distribution groove, and one of the substrate layer and the polymer layer is a machined layer having a thickness that varies in correspondence with the at least one oil distribution groove, the method comprising either
 depositing the polymer layer onto the metallic substrate layer and then
 machining the axial polymer face,
or
 machining the axial substrate face and then
 depositing the polymer layer onto the machined substrate layer.

Advantageously, the polymer layer may be more resilient against wear, fatigue and seizure than the aluminium-tin running layer of known bi-metal thrust washers.

Advantageously, at the end-of-life, disposal of a metal and polymer bi-material thrust washer may be less difficult than that of known bi-metal thrust washers. Further, the manufacturing costs to form the profiled face of the polymer layer is less than to form a profiled face in the face of the aluminium-tin running layer of a known bi-metal thrust washer.

The polymer layer may be the machined layer. In the case that the polymer layer is the machined layer, the polymer layer may have a maximal thickness (i.e. in the pad regions) of 20 to 100 µm. Advantageously, in the case that the polymer is machined to form the oil distribution groove, the polymer material may be machined more quickly than an aluminium-tin running layer in a known bi-metal thrust washer. Further, machining the polymer layer is less wearing on the tool-bit (e.g. cutting tool) used for the machining process than machining the metallic/metallic alloy (e.g. aluminium-tin or copper-alloy based) running layer of known bi-metal thrust washers, reducing manufacturing costs. Yet further, using machined polymer may enable the manufacture of a running layer with a smoother surface finish than for a known machined metal/metal alloy running layer, providing correspondingly improved hydrodynamic performance.

Wear resistance of the polymer running layer may be greater than an aluminium-tin running layer, in particular in the case that the polymer layer comprises metallic particulate dispersed throughout the polymer. Further, the polymer layer may provide a lower coefficient of friction and greater compatibility than an aluminium-tin running layer, particularly in the case that the polymer layer comprises solid lubricant particulate dispersed throughout the polymer.

The oil distribution groove may extend only part way through the polymer layer.

The substrate layer may be the machined layer. By the use of a polymer running layer, it is possible to provide the machining in the substrate layer (in contrast, in the known bi-metal thrust washer, a machined substrate would not be suitable for the application of an aluminium-tin running layer by a roll-bonding process). In the case that the substrate layer is the machined layer, the polymer layer may have a substantially uniform thickness of 6 to 20 µm which follows the contours of the profiled face of the substrate layer onto which it is deposited, and preferably has a thickness of 6 to 12 µm. Advantageously, machining the substrate layer enables the use of a thin polymer layer, with a corresponding cost saving for materials, which may also have an increased fatigue resistance compared with a thicker polymer layer. Further, machining the substrate layer avoids the risk of generating bi-material swarf from machining the running layer of known bi-metallic running layers, and so simplifies waste disposal. Yet further, machining the substrate layer enables use of a polymer layer that is not machined, thereby avoiding the risk of potential flaws in the edges of the polymer machining (referred to as a "feathered edge").

The thrust washer may be generally semi-annular, annular or circular.

The oil distribution groove may comprise a channel and a ramp region. The channel region is the most deeply recessed part of the groove, and the ramp region has a low ramp slope. The ramp region may have a ramp slope in which the increase in thickness of the machined layer is less than 25 µm per 1 mm across the axial face, perpendicular to the oil distribution groove.

The oil distribution groove may comprise a channel between a first ramp region and a second ramp region. The first and second ramp regions may have different ramp slopes. Advantageously, the use of different ramp slopes may optimise the thrust washer for a particular direction of crankshaft rotation. The oil distribution groove may comprise the channel and one ramp region, the channel being bounded by an abrupt edge on the other side from the ramp region. Alternatively, the oil distribution groove may comprise a channel region between abrupt edges of the profiled polymer layer.

The oil distribution groove may be provided between pad regions in which the thrust washer has a uniform thickness.

The thrust washer may be provided with 1 to 10 oil distribution grooves. A thrust washer having an inner edge with a diameter of less than 70 mm may have a 1 to 7 oil distribution grooves. A thrust washer having a diameter more than 70 mm may have 1 to 10 oil distribution grooves.

The polymer layer may be the machined layer, and the method may comprise depositing the polymer layer onto the metallic substrate layer, and then machining the axial polymer face.

The substrate layer may be the machined layer, and the method may comprise machining the axial substrate face, and then depositing the polymer layer onto the machined substrate layer.

The method may comprise forming a substrate blank from a sheet of substrate material, and depositing the polymer onto the pre-formed substrate blank.

The method may comprise depositing the polymer onto a sheet of substrate material, and forming polymer-coated substrate blanks from the sheet of substrate material.

The method may comprise selectively depositing the polymer onto the sheet of substrate material.

The method may comprise depositing the polymer by a process selected from the group consisting of: a pad printing process; a masked screen-printing process; or, by a masked spraying process.

The method may comprise curing the polymer layer.

The profiled polymer layer may be a plastics polymer material selected from the group consisting of: polyimide/amide resin, acrylate resin, epoxy resin, fluoropolymer (e.g. PTFE) and formaldehyde. The profiled polymer layer may comprise a composite of a plastics polymer matrix with particulate dispersed throughout the matrix. The particulate may be hard particulate (e.g. ceramic powder, silica, and metal powder such as aluminium flakes) and/or soft particulate (e.g. $MoS_2$ and graphite, and fluoropolymer such as PTFE). The polymer may comprise a matrix of a polyimide/amide plastics polymer material and having distributed throughout the matrix: from 5 to less than 25% vol of a metal particulate (e.g. metal powder and/or metal flakes); from 1 to 20% vol of a fluoropolymer, the balance being the polyimide/amide resin apart from incidental impurities.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100; and, typographical marks (e.g. primes). For example, in different figures, 100, 100', 200, 200' and 300 have been used to indicate a thrust washer.

Figure 1A:
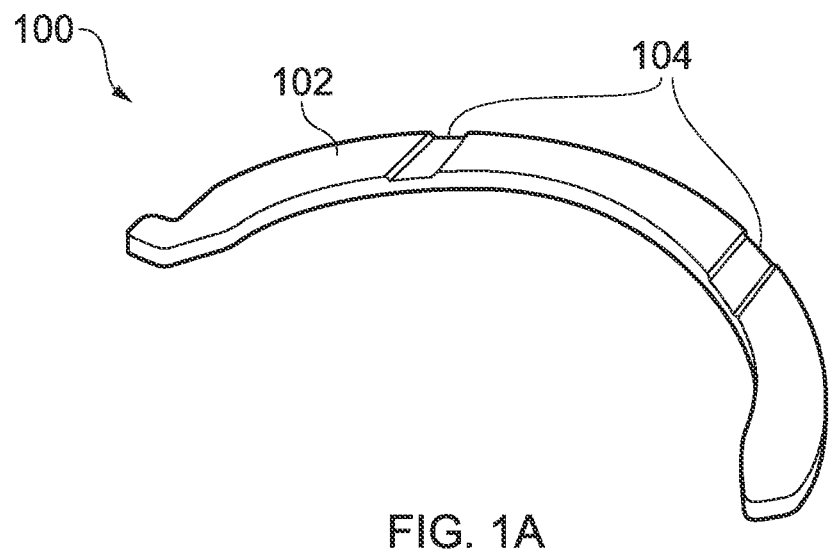
FIGS. 1A and 1B show perspective views of thrust washers according to the present invention.

FIG. 1A illustrates a thrust washer 100 that has a substantially semi-annular shape (e.g. it is generally semi-annular in shape, and may have projecting hooks and tabs, for engagement with other parts of the bearing assembly). An axial face 102 (i.e. a face perpendicular to the axis of rotation of a shaft received into a bearing assembly comprising the thrust washer) of the thrust washer 100 has parallel oil distribution grooves 104 running between the inner and outer edges of the thrust washer. In use, lubricating oil is pumped into the bearing clearance between a bearing shell and rotating shaft, and leaks out into the further clearance between the thrust washer and the rotating counterfaces of the crankshaft webs. The provision of the oil distribution grooves 104 in the axial face 102 of the thrust washer 100 enhances the pressure and quality of the oil film between the thrust washer and the shaft.

Figure 1B:
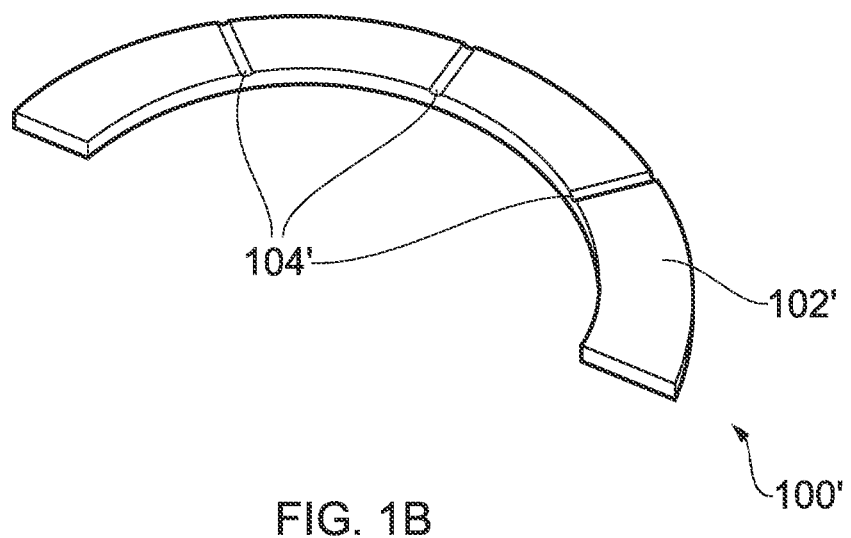

FIG. 1B illustrates an alternative arrangement of oil distribution grooves 104' on the axial face 102' of a further thrust washer 100', in which the oil distribution grooves are aligned radially on the axial face.

Figure 2A:
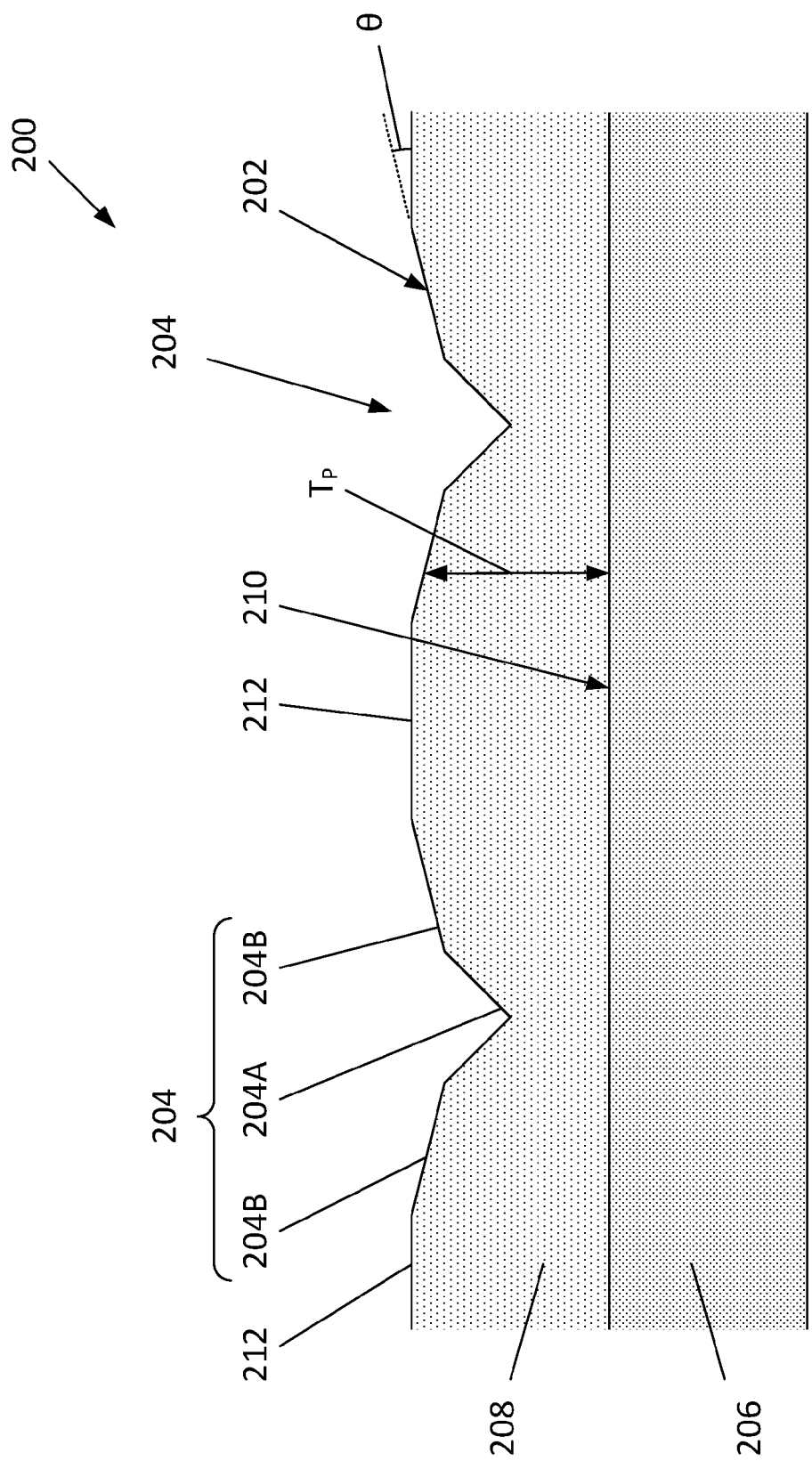
FIG. 2A shows a cross-sectional view of a thrust washer according to a first embodiment the present invention, formed by a first manufacturing method.

FIG. 2A illustrates a cross-sectional view through part of a thrust washer 200 according to a first embodiment, viewed perpendicular to length of the oil distribution grooves 204. The thrust washer 200 comprises a metallic substrate (e.g. a steel backing) 206 and a profiled polymer layer 208 on an axial face 210 of the substrate.

The substrate 206 has a uniform thickness, and the oil distribution grooves 204 are provided in the axial face of the polymer 202 (axial polymer face, also the axial face of thrust washer) by the variation in thickness $T_P$ of the polymer layer 208 across the axial face 210 of the substrate (axial substrate face). The oil distribution grooves 204 are provided between pad regions 212 in which the thrust washer 200 has a uniform thickness, and have a lesser thickness than the pad regions. The polymer layer 208 has a maximal thickness (in the pad regions) of 20 to 100 μm. The oil distribution grooves 204 each comprise a channel 204A and ramp regions 204B between the channel and the neighbouring pad regions 212. Although exaggerated for clarity in FIG. 2A, the channel is the deepest part of the groove, and the ramp regions 204B have a low ramp slope θ, e.g. a gradient of approximately 1:300 to 1:100, e.g. 1:200, corresponding to approximately ⅓°. The ramp region provides a tapered clearance between the thrust washer 200 and the counterface of a crankshaft, in use, which provides a hydrodynamic wedge of lubrication oil to assist in maintaining separation of the thrust washer and counterface.

During manufacturing, the polymer is deposited on the substrate as a layer of approximately uniform thickness, and fully cured, before the variable thickness profile is formed by a machining process. The polymer may be deposited onto a pre-formed substrate blank, after it has been stamped or otherwise formed from a sheet of substrate material. Alternatively, the polymer may be deposited onto an uncut sheet of substrate material, before the coated substrate blank is formed. In the latter case, the polymer may be patterned when deposited (i.e. selective deposition rather than complete coverage of the substrate), for example by use of a pad printing process, a masked screen-printing process, or by a masked spraying process. Accordingly, the production of bi-material waste can be avoided. Further, even if the blanks were cut from a sheet of the metallic substrate, having polymer that extends beyond the blank, onto the substrate waste, the metal-polymer bi-material waste would be less difficult to recycle than the manufacturing waste from a known bi-metal thrust washer. Similarly, at the end-of-life, the metal-polymer thrust washer is less difficult to recycle than a known bi-metal thrust washer.

In FIG. 2A each oil distribution groove is substantially symmetric, having a channel formed between a pair of ramp regions having equal ramp slopes. However, the thrust washer may be optimised for rotation of the shaft in a particular direction, in which case the ramp regions on opposite sides of each oil distribution groove may have different ramp slopes (i.e. the oil distribution grooves may have asymmetric cross-sections), or one of the ramp regions may be omitted, such that the oil distribution grooves have only one ramp region, with a relatively abrupt edge to the polymer (e.g. an edge that is perpendicular to the plane of the thrust washer, or at more than 45° to the plane of the thrust washer) on the other side of the channel.

Figure 2B:
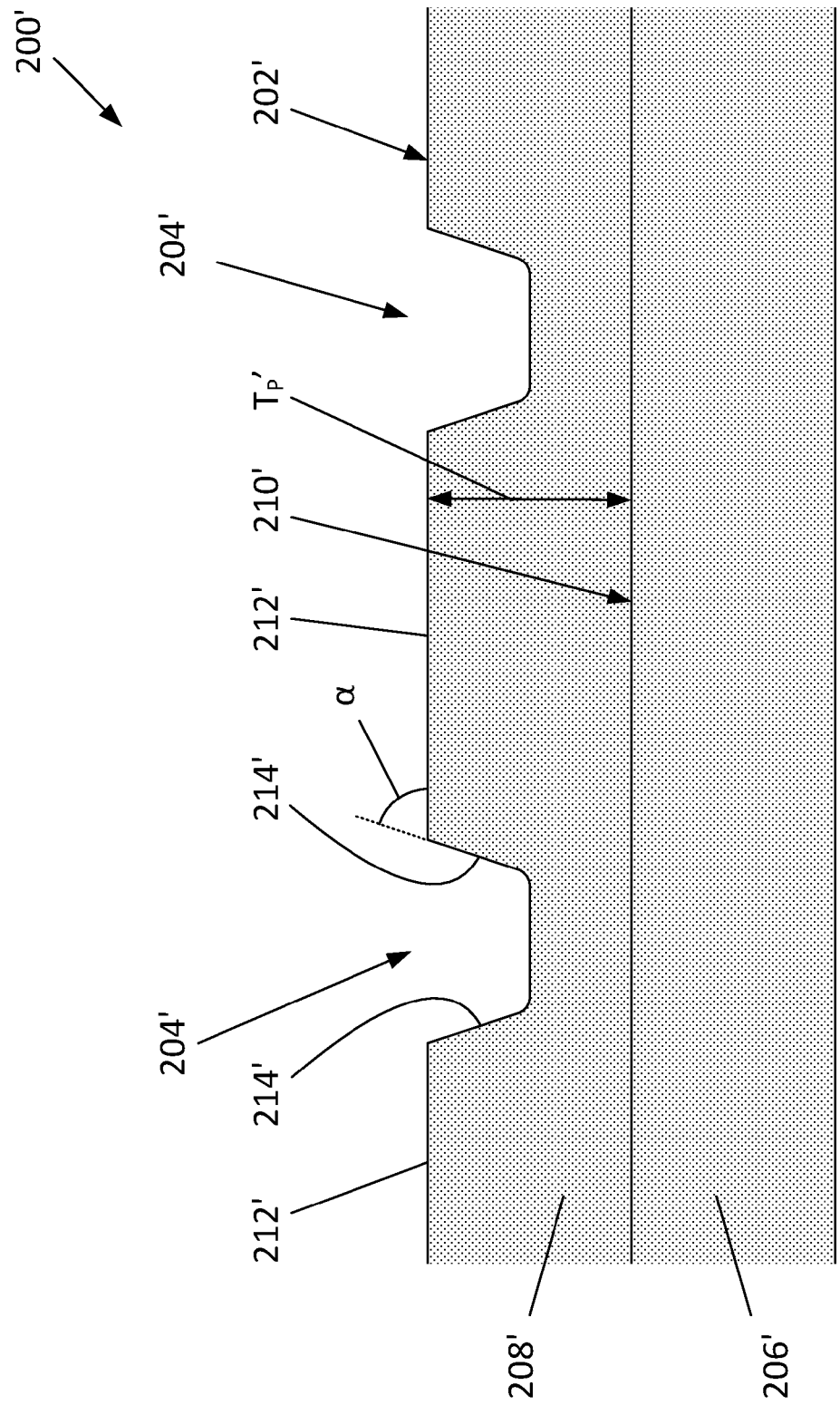
FIG. 2B shows a cross-sectional view of a thrust washer according to a second embodiment the present invention, formed by a first manufacturing method.

FIG. 2B illustrates a further embodiment, which the thrust washer 200' differs from the thrust washer 200 of FIG. 2A by having oil distribution grooves without ramp regions, in which the grooves each comprise channels 204' that are defined by abrupt edges 214' of the polymer 208'. The channel 204' may be trapezoidal (or have a rounded-shape) in cross-sectional shape, and the abrupt edges 214' form an angle α of 65° with the plane of the thrust washer, in the illustrated example.

Figure 3:
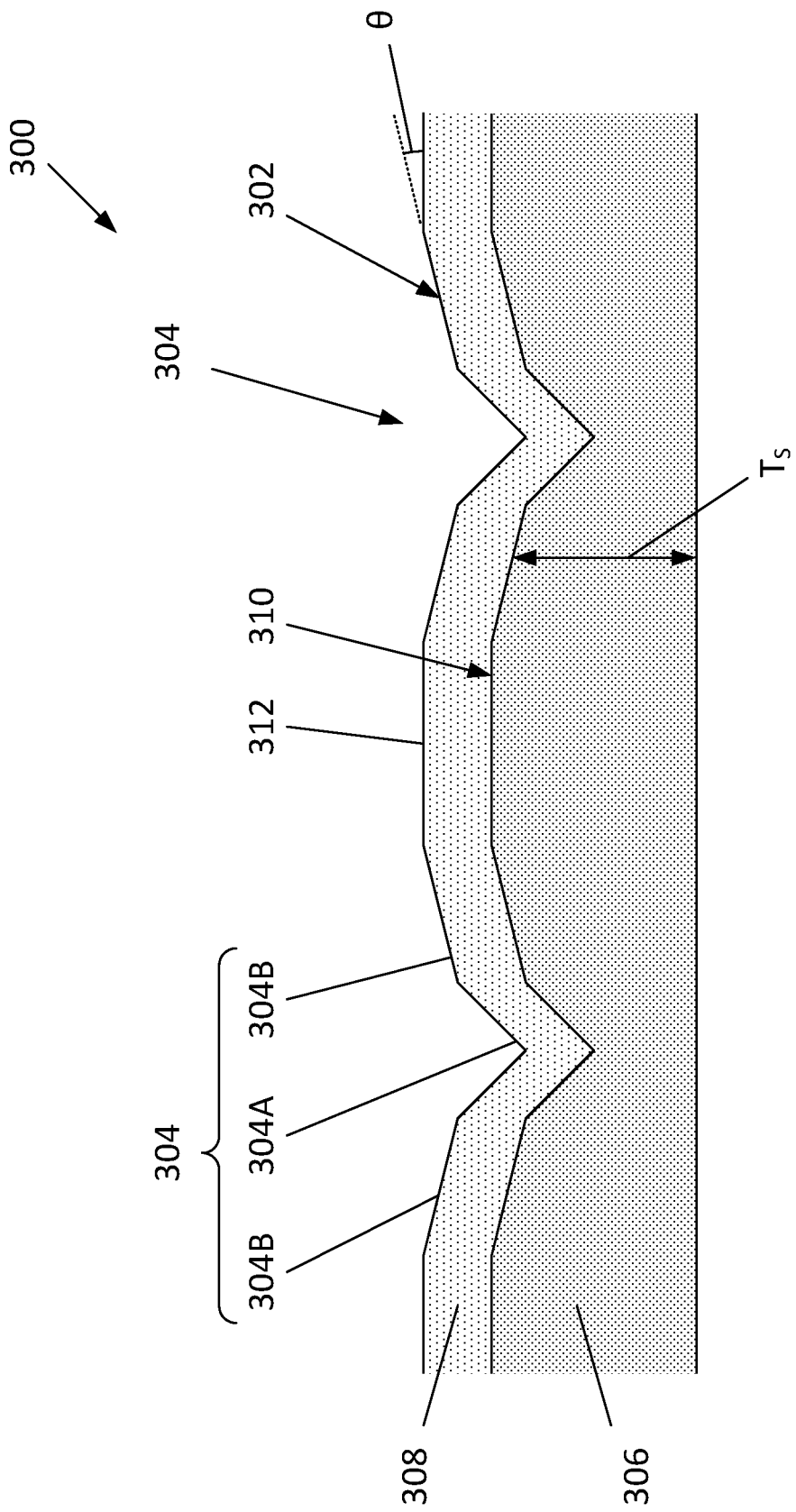
FIG. 3 shows a cross-sectional view of a thrust washer according to a third embodiment the present invention.

FIG. 3 illustrates a cross-sectional view through part of a thrust washer 300 according to a third embodiment, viewed perpendicular to the oil distribution grooves 304. The thrust washer 300 comprises a profiled metallic substrate (e.g. a steel backing) 306 and a polymer layer 308 on an axial face 310 of the substrate. The polymer layer 308 has a substantially uniform thickness of 6 to 20 μm.

The substrate 306 varies in thickness $T_s$ to provide a correspondingly profiled axial face 310 of the substrate. The polymer layer 308 has a substantially uniform thickness, and has an axial face 302 that is profiled in correspondence with the profiled axial face 310 of the substrate 306, to provide the oil distribution grooves 304 on the axial face 302 of the polymer. The oil distribution grooves 304 are provided between pad regions 312 in which the thrust washer 300 has a uniform thickness, and the grooves have a lesser thickness than the pad regions. The oil distribution grooves 304 each comprise a channel 304A and ramp regions 304B between the channel and the neighbouring pad regions 312. Although exaggerated for clarity, as per the first embodiment in FIG. 2A, the ramp regions 304B have a low ramp slope θ, corresponding to a gradient of approximately 1:300 to 1:100.

During manufacturing, the substrate is machined to provide the profiled axial substrate face before the polymer is deposited on the substrate as a layer of uniform thickness. The substrate may be conveniently machined before the substrate blank is formed from a sheet. Alternatively, the pre-formed substrate blank may be machined.

As with the first embodiment, the polymer in the third embodiment may be deposited onto a pre-formed blank, after it has been stamped or otherwise formed from a sheet of substrate material. Alternatively, the polymer may be deposited onto an uncut sheet of substrate material, before the blank is formed. In the latter case, the polymer may be patterned when deposited (i.e. selective deposition rather than complete coverage of the substrate), for example by use of a pad printing process, a masked screen-printing process, or by a masked spraying process. Accordingly, the production of bi-material waste can be avoided. Further, even if the blanks were cut from a sheet of the metallic substrate, having polymer that extends beyond the blank, the metal-polymer bi-material waste would be less difficult to recycle than the manufacturing waste from a known bi-metal thrust washer.

In the illustrated examples: The metal substrate is a steel substrate. The profiled polymer layer is a composite of a plastics polymer matrix and particulate distributed throughout the matrix. The plastics polymer material is selected from the group consisting of: polyimide/amide resin, acrylate resin, epoxy resin, fluoropolymer and formaldehyde. In particular, the polymer may be a composite polyimide/amide based polymer, such as a composite having a matrix of a polyimide/amide plastics polymer material and having distributed throughout the matrix: from 5 to less than 25% vol of a metal particulate (e.g. metal powder and/or metal flakes); from 1 to 20% vol of a fluoropolymer, the balance being the polyimide/amide resin apart from incidental impurities. Further, the polymer composite may be 12.5% vol Al, 5.7% vol PTFE particulate, 4.8% vol silane, <0.1% vol other components, and balance (approximately 77% vol) polyimide/amide.

Although illustrated in FIGS. 1A and 1B in relation to a generally semi-annular thrust washer, the present invention equally applies to annular or circular thrust washers.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A thrust washer comprising:
a metallic substrate layer having an axial substrate face,
a polymer layer on the axial substrate face and having an axial polymer face opposed to the axial substrate face,
wherein the axial polymer face is profiled and has at least one oil distribution groove, and at least the substrate layer is a machined layer having a thickness that varies in correspondence with the at least one oil distribution groove.

2. A thrust washer according to claim 1, wherein the at least one oil distribution groove extends only part way through the polymer layer.

3. A thrust washer according to claim 2, wherein the at least one oil distribution groove comprises a channel region between abrupt edges of the profiled polymer layer.

4. A thrust washer according to claim 2, wherein the at least one oil distribution groove is provided between pad regions in which the thrust washer has a uniform thickness.

5. A thrust washer according to claim 1, wherein the at least one oil distribution groove comprises a channel and at least one ramp region.

6. A thrust washer according to claim 5, wherein the at least one oil distribution groove comprises a channel between a first ramp region and a second ramp region.

7. A thrust washer according to claim 5, wherein the at least one ramp region has at least one of a gradient of approximately 1:300 to 1:100, and a ramp slope corresponding to approximately $\frac{1}{3}°$.

8. A thrust washer according to claim 1, wherein the at least one oil distribution groove comprises a channel region between abrupt edges of the profiled polymer layer.

9. A thrust washer according to claim 1, wherein the at least one oil distribution groove is provided between pad regions in which the thrust washer has a uniform thickness.

10. A thrust washer according to claim 1, wherein the profiled polymer layer has a substantially uniform thickness, and the axial face of the polymer layer is profiled to correspond to a profiled axial face of the substrate layer.

11. A thrust washer according to claim 1, wherein the profiled polymer layer is a composite of a plastics polymer matrix and a particulate distributed throughout the matrix.

12. A thrust washer according to claim 11, wherein the matrix is a polyamide/amide plastics polymer and the particulate is at least one of metal powder and metal flakes.

13. A flange bearing comprising a bearing shell and a thrust washer, the thrust washer including:
a metallic substrate layer having an axial substrate face,
a polymer layer on the axial substrate face and having an axial polymer face opposed to the axial substrate face,
wherein the axial polymer face is profiled and has at least one oil distribution groove, and at least the substrate layer is a machined layer having a thickness that varies in correspondence with the at least one oil distribution groove.

14. A method of forming a thrust washer including a metallic substrate layer having an axial substrate face, and a polymer layer on the axial substrate face and having an axial polymer face opposed to the axial substrate face, the method comprising one of:
(i) depositing the polymer layer onto the metallic substrate layer and then machining the axial polymer face, or
(ii) machining the axial substrate face and then depositing the polymer layer onto the machined substrate layer;
wherein the axial polymer face is profiled and has at least one oil distribution groove, and at least the substrate layer is a machined layer having a thickness that varies in correspondence with the at least one oil distribution groove.

15. A method according to claim 14, further comprising machining the axial substrate face, and then depositing the polymer layer onto the machined substrate layer.

16. A method according to claim 14, comprising forming a substrate blank from a sheet of substrate material, and depositing the polymer onto the preformed substrate blank.

17. A method according to claim 14, comprising depositing the polymer onto a sheet of substrate material, and forming polymer-coated substrate blanks from the sheet of substrate material.

18. A method according to claim 17, comprising selectively depositing the polymer onto the sheet of substrate material.

19. A method according to claim 14, comprising depositing the polymer layer by a process selected from the group consisting of: a pad printing process; a masked screen-printing process; or, by a masked spraying process.

20. A method according to claim 14, comprising curing the polymer layer.

* * * * *